United States Patent
Reid et al.

(10) Patent No.: US 8,533,637 B2
(45) Date of Patent: Sep. 10, 2013

(54) RETARGETING BASED ON PROCESS WINDOW SIMULATION

(75) Inventors: Christopher E Reid, Tigard, OR (US); George P Lippincott, Lake Oswego, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 12/981,340

(22) Filed: Dec. 29, 2010

(65) Prior Publication Data

US 2011/0161895 A1     Jun. 30, 2011

Related U.S. Application Data

(60) Provisional application No. 61/290,633, filed on Dec. 29, 2009.

(51) Int. Cl.
*G06F 17/50* (2006.01)

(52) U.S. Cl.
USPC ............ 716/53; 716/50; 716/51; 716/54; 716/55

(58) Field of Classification Search
USPC ............... 716/50, 51, 52, 53, 54, 55
See application file for complete search history.

(56) References Cited

U.S. PATENT DOCUMENTS

| | | | |
|---|---|---|---|
| 7,568,179 B1 * | 7/2009 | Kroyan et al. | 716/51 |
| 2007/0277145 A1 * | 11/2007 | Scaman | 716/19 |
| 2009/0241077 A1 | 9/2009 | Reid et al. | |
| 2011/0119642 A1 * | 5/2011 | Agarwal et al. | 716/50 |

OTHER PUBLICATIONS

Resolution Enhancement Technology: The Past, the Present, and Extensions for the Future, Frank M. Schellenberg, Optical Microlithography XVII, edited by Bruce W. Smith, Proceedings of SPIE vol. 5377.

* cited by examiner

*Primary Examiner* — Vuthe Siek
*Assistant Examiner* — Brian Ngo (57) ABSTRACT

Aspects of the invention relate to retargeting based on process window simulation to fix hotspots. The process window simulation is performed to generate process window information. Edge fragments are selected for retargeting. Based on the process window information, the selected edge fragments are retargeted in a balanced way.

15 Claims, 9 Drawing Sheets

RETARGETING BASED ON PROCESS WINDOW SIMULATION

RELATED APPLICATIONS

This application claims priority to U.S. Provisional Patent Application No. 61/290,633, entitled "Process Window Control for Site Selective OPC," filed on Dec. 29, 2009, and naming Christopher E. Reid and George P. Lippincott as inventors, which application is incorporated entirely herein by reference.

FIELD OF THE INVENTION

The present invention relates to photolithographic processing. Various aspects of the invention may be particularly useful for retargeting layout features based on process window simulations.

BACKGROUND OF THE INVENTION

Electronic circuits, such as integrated circuits (ICs), are used in a variety of products, from automobiles to microwaves to personal computers. Designing and fabricating IC devices typically involves many steps, sometimes referred to as the "design flow." The particular steps of a design flow often are dependent upon the type of the circuit, its complexity, the design team, and the circuit fabricator or foundry that will manufacture the circuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing IC components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

Circuit layout descriptions can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or polylines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. Adding to the difficulty associated with increasingly smaller feature size is the diffractive effects of light. These effects often result in defects where the intended or "target" image is not accurately "printed" onto the substrate during the photolithographic process, creating flaws in the manufactured device. One type of flaw is the proximity effect. The proximity effect refers to variations in the linewidth of a feature (or a shape for a 2D pattern) as a function of the proximity of other nearby features. The simplest example of a proximity effect is the difference in printed linewidth between an isolated line and a line in a dense array of equal lines and spaces.

To address the problem, one or more resolution enhancement techniques are often employed to improve the resolution of the image that the mask forms on the substrate during the photolithographic process. Examples of various resolution enhancement techniques are discussed in "Resolution Enhancement Technology: The Past, the Present, and Extensions for the Future," Frank M. Schellenberg, Optical Microlithography XVII, edited by Bruce W. Smith, Proceedings of SPIE Vol. 5377, which article is incorporated entirely herein by reference. One of these techniques, "optical proximity correction" or "optical process correction" (OPC), adjusts the amplitude of the light transmitted through a lithographic mask by modifying the layout design data employed to create the mask. For example, edges in the layout design may be adjusted to make certain portions of the geometric elements larger or smaller, in accordance with how much additional light exposure (or lack of exposure) is desired at certain points on the substrate. When these adjustments are appropriately calibrated, proximity effects are reduced and overall pattern fidelity is greatly improved.

In addition to reducing proximity effects, process variations (or process errors) must also be considered to achieve high lithographic quality. There are a very large number of potential process errors in the semiconductor fabrication plant, from variations in the wafer filmstack to batch-to-batch variations in resist properties, from scanner stage vibrations to PEB (post-exposure bake) hot plate temperature nonuniformities. Most errors in the fabrication plant may be classified into two basic categories: errors that behave like dose errors (referred to as dose errors hereafter) and errors that behave like focus errors (referred to as focus errors hereafter). Engineers sometimes define a third category of process errors, called masking sizing errors. Mask sizing errors arise from the fact that masks are exposed progressively in small sections and process conditions may change during the exposure process. Any of the three process error categories can affect lithographic quality.

The term "process window" is often used to characterize how the lithographic process responds to changes in focus and doses. A process window may be defined as a window made by plotting contours that correspond to various specification limits as a function of process variations. One common process window, called the CD process window, is a contour plot of the high and low critical dimension (CD) specifications as a function of dose and focus variations. Here, the term CD, also called the linewidth or feature width, refers to the size (width) of a feature printed in resist, measured at a specific height above the substrate. The contour plot form of data visualization is useful for establishing the limits of exposure and focus that allow the printed image to meet certain specifications. Another form often used for visualizing the impact of process variations is the process variability (PV) band. The PV band defines the region of edge placement uncertainty when the layout design is subject to process variations. It is plotted as a band along the edges of layout features. The larger the process variation, the wider the PV band. The PV band may be derived using a process window simulation which simulates process variations.

A layout design may have regions with printability problems that are caused by process variations unavoidable in the fabrication plant. These regions are lithography hotspots or litho hotspots. Litho hotspots may be corrected by modifying layout designs in such a manner as to cause a change in the final printed contours. For example, pinching hotspots require an increase of the width of a printed contour subject to pinching while bridging hotspots requires an increase of the spacing between two printed contours subject to bridging. This layout modification procedure is often referred to as retargeting as the original drawn target of layout features is changed. Retargeting can be performed by either designers or manufacturers. As for the latter, retargeting is usually performed along with OPC and with the help of process window simulations. OPC and process window simulations are computationally demanding. It is thus desirable to develop efficient methods for retargeting.

BRIEF SUMMARY OF THE INVENTION

Aspects of the invention relate to retargeting based on process window simulation to fix hotspots in a layout design. The process window simulation is performed on the layout design to generate process window information. Edge fragments in the layout design are selected for retargeting. Based on the process window information, the selected edge fragments are retargeted in a balanced way.

Retargeting in a balanced way involves adjusting target positions of the edge fragments to balance various constraints and conditions. The various constraints and conditions may be derived from the process window information, the layout design, and/or the information provided by users. Most of the various constraints and conditions may be treated as spring forces acting on edge fragments because their mathematical representations are similar to those of spring forces. In various embodiments of the invention, pairs of simulation sites on or near the hotspots are identified. Edge fragments associated with these simulation sites are therefore identified. A CD gauge may be placed for each of the identified pairs. CD violations are treated as a category of spring forces attempting to move the edge fragments in a direction to reduce CD violations. Enclosure violations may also be considered as the same category of spring forces. Instead of reducing CD violations, the enclosure "forces" attempt to move the edge fragments in a direction to reduce enclosure violations. The magnitudes of both the CD gauge forces and the enclosure forces are proportional to the sizes of the corresponding violations. Another category of forces is the restoring forces. The restoring forces also act like spring forces but attempt to pull the edge fragments back to the nominal target. The magnitude of the restoring force for an edge fragment is proportional to the deviation of its position from its target position. The limits on how much nominal image EPE (edge placement error) to sacrifice may be addressed in two forms. One form is through modifying the restoring forces. The other form is to set limits for moving the edge fragments when balancing the various forces acting on the edge fragments. Various forces acting from both sides of the edge fragments may be balanced by running a time-domain simulation on all the identified edge fragments.

The retargeting process may be combined with the OPC process. The achievable target derived by the OPC process will be retargeted according to some embodiments of the invention. This process may be repeated.

DETAILED DESCRIPTION OF THE INVENTION

Various aspects of the present invention relate to retargeting layout features based on process window simulations. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "generate" and "derive" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Operating Environment

The execution of various electronic design automation processes may be implemented using computer-executable software instructions executed by one or more programmable computing devices. Because these examples of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

Figure 1:
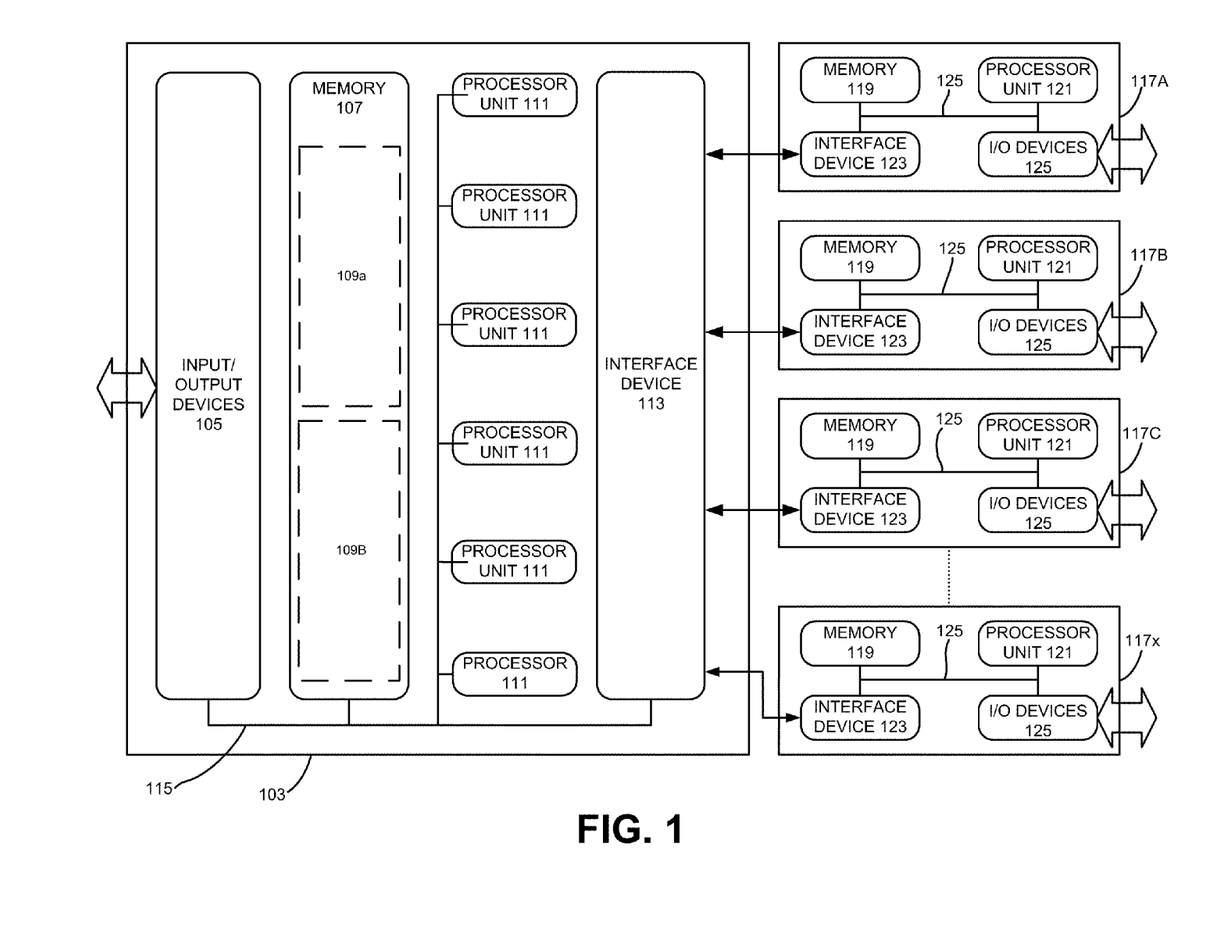
FIG. 1 illustrates an example of a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
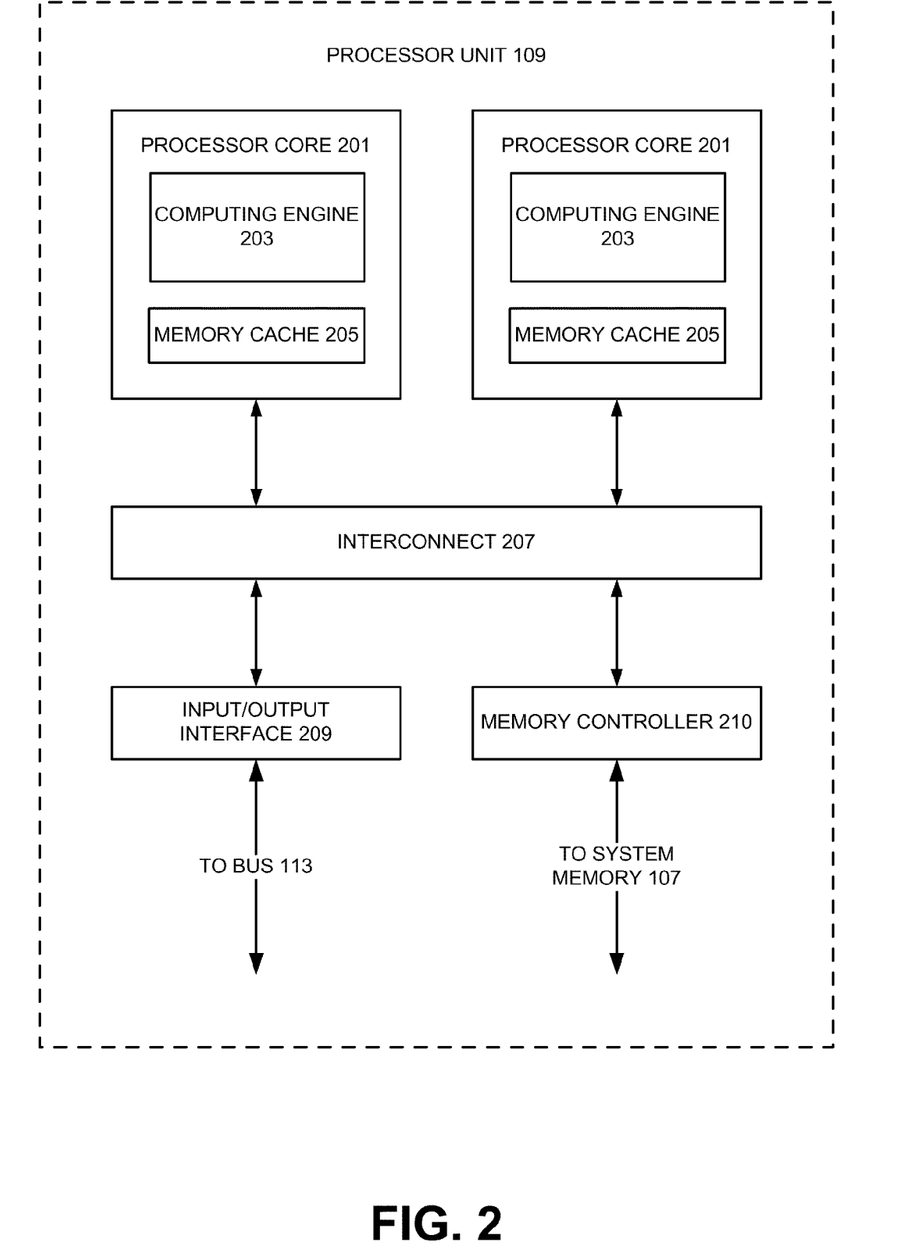
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 1157, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Retargeting Tool

Figure 3:
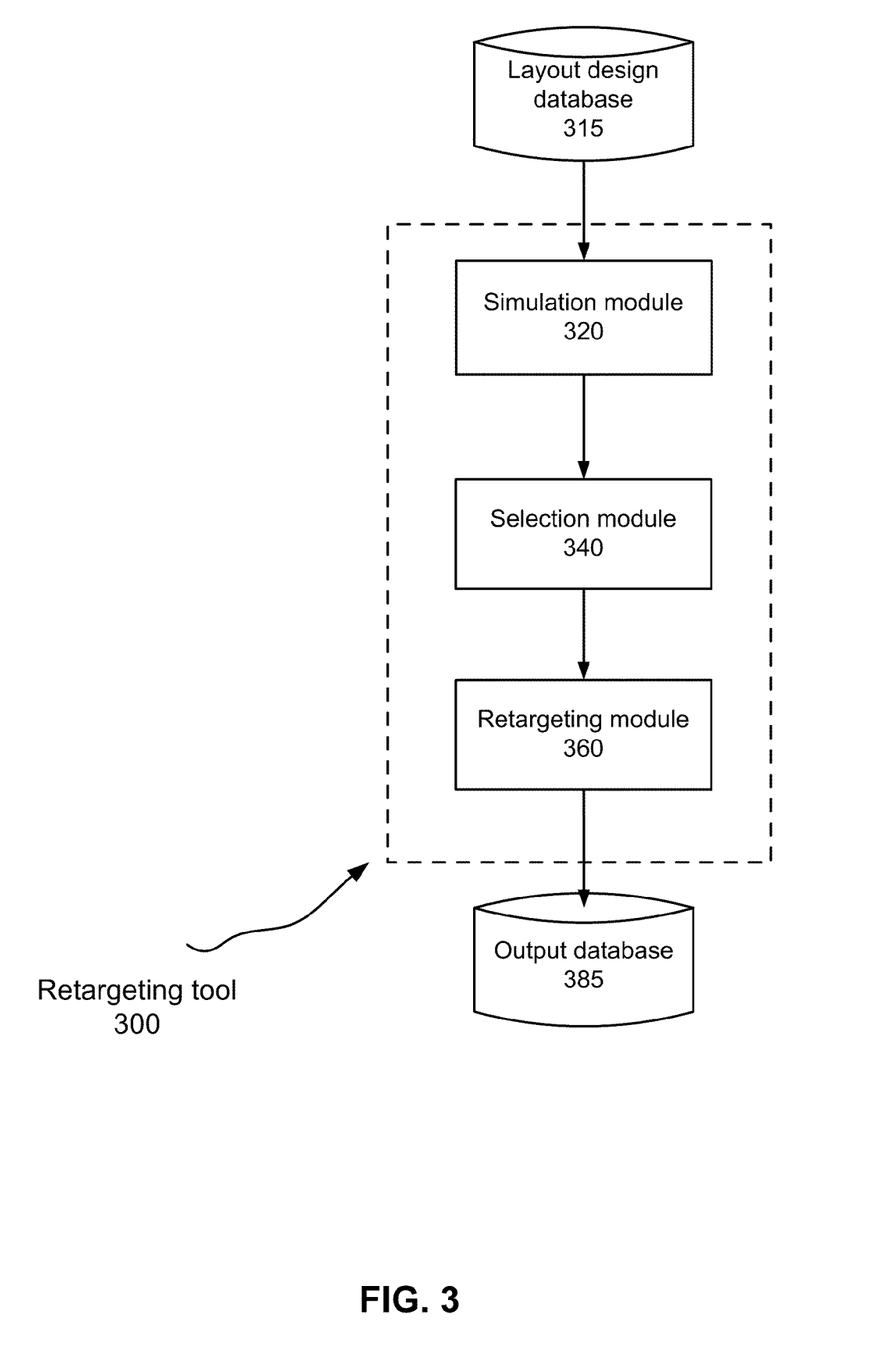
FIG. 3 illustrates an example of a retargeting tool.

FIG. 3 illustrates an example of a retargeting tool 300 that may be implemented according to various embodiments of the invention. The retargeting tool 300 uses process window simulations to find litho hotspots and then to retarget layout features to fix them. As seen in the figure, the retargeting tool 300 includes a simulation module 320, a selection module 340, and a retargeting module 360. As also shown in this figure, various implementations of the retargeting tool 300 may cooperate with (or incorporate, in whole or part) a layout design database 315 and an output database 385.

The simulation module 320 receives layout data from the layout design database 315 and performs process window simulations to generate process window information. The selection module 340 selects edge fragments that may need to be retargeted. The selection may be based on user input information, process window information or both. In various embodiments of the invention, to select the edge fragments, the selection module 340 may first identify simulation sites. As will be discussed in detail below, the retargeting tool may be used during the OPC process. The simulation sites used by OPC may serve as simulation site candidates for retargeting. Additional simulation sites may be needed in some situations. Then, the selection module 340 uses CD gauges to connect pairs of the simulation sites. It should be noted that CD gauges are not physical features added to the layout design. Rather, they are applied as a computational tool for retargeting and will be discussed in detail later.

Based on the process window information, the retargeting module 360 attempts to repair the hotspots by adjusting targeted positions for the edge fragments in a balanced way. Retargeting in a balanced way involves adjusting target positions of the edge fragments to balance various constraints and conditions. The various constraints and conditions may be derived from the process window information, the layout design, and/or the information provided by users. Most of the various constraints and conditions may be treated as spring forces acting on edge fragments because their mathematical representations are similar to those of spring forces. As mentioned earlier, the CD gauge forces and the enclosure forces attempt to move the edge fragments in a direction to reduce CD and enclosure violations, respectively, while the restoring forces attempt to pull the edge fragments back to the nominal target. The limits on how much nominal image EPE (edge placement error) to sacrifice may modify the restoring forces and/or set limits for moving the edge fragments. The retargeting module 360 may run a time-domain simulation on all the selected edge fragments to balance these forces. Finally, the retargeted edge fragment positions are saved in the output database 385.

While the simulation module 320, the selection module 340, and the retargeting module 360 are connected in series in FIG. 3, the retargeting tool may have other configurations. For example, the simulation module 320 and the selection module 340 may be connected directly to the retargeting module 360 as the selection module 340 may select the edge fragments mainly based on user-supplied rules.

As previously noted, various embodiments of the invention may be embodied by a computing system, such as the computing system illustrated in FIG. 1 and FIG. 2. Accordingly, one or more components of each of the simulation module 320, the selection module 340, and the retargeting module 360 may be implemented using one or more processors in a computing system. It should be appreciated that, while these three modules are shown as separate units in FIG. 3, a single computer (or a single processor in a computing system) may be used to implement two or all of these modules at different times. Also, various examples of the invention may be embodied by software-executable instructions, stored on a computer-readable medium, for instructing a computing system to implement one or more components of each the simulation module 320, the selection module 340, and the retargeting module 360. Further, each module may either be fully automated or allow a user to provide instructions for an operation. Still further, while the layout design database 315 and the output database 385 are shown as separate units in FIG. 3, a single computer accessible medium may be used to implement both of these databases.

Retargeting Based on Process Window Simulations

Figure 4:
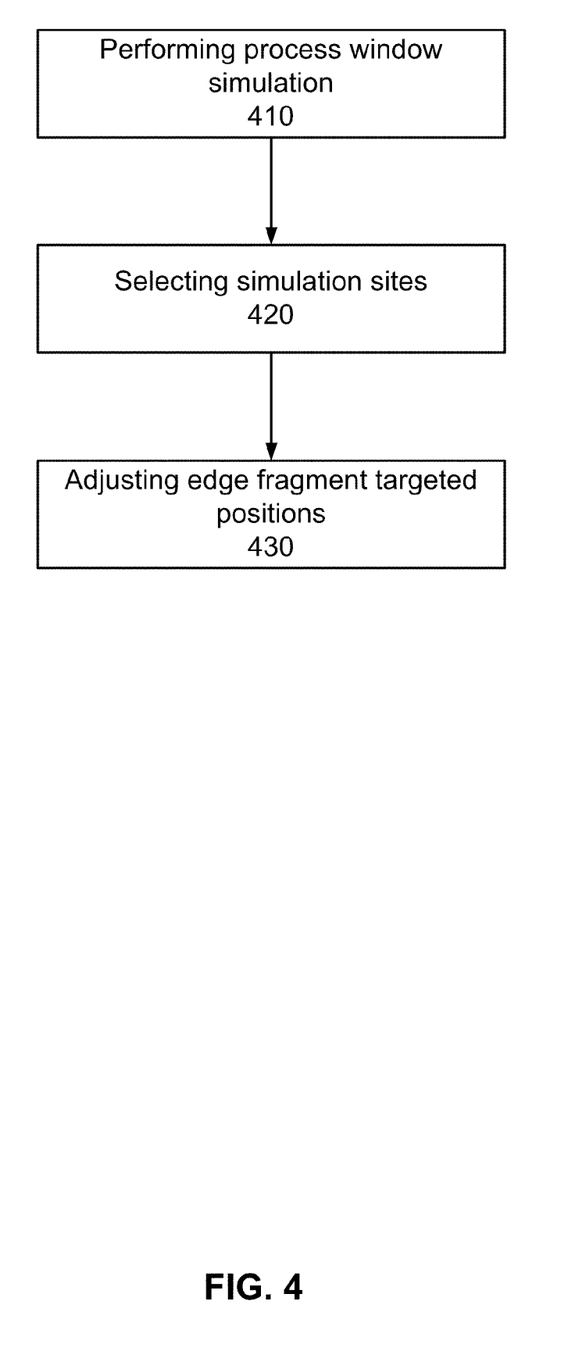
FIG. 4 illustrates a flowchart describing methods of retargeting according to various embodiments of the invention.

FIG. 4 illustrates a flowchart describing methods of retargeting according to various embodiments of the invention. For purposes of explanation, various methods encompassed in FIG. 4 will be described with reference to the retargeting tool 300 discussed earlier. It should be appreciated that the operations illustrated in FIG. 4 may be employed by implementations of a different retargeting tool, according to various embodiments of the invention. Likewise, it should be appreciated that the retargeting tool 300 shown in FIG. 3 or in other configurations may be used to perform methods according to various embodiments of the invention different from those encompassed by the flowchart of FIG. 4.

Also, it should be appreciated that various embodiments of the invention may be implemented by a system comprising one or more processors programmed to perform the operations described in FIG. 4. Still further, various embodiments of the invention may be implemented by processor-executable instructions, stored in a processor-readable medium, for causing one or more processors to perform the operations described in FIG. 4.

Figure 5:
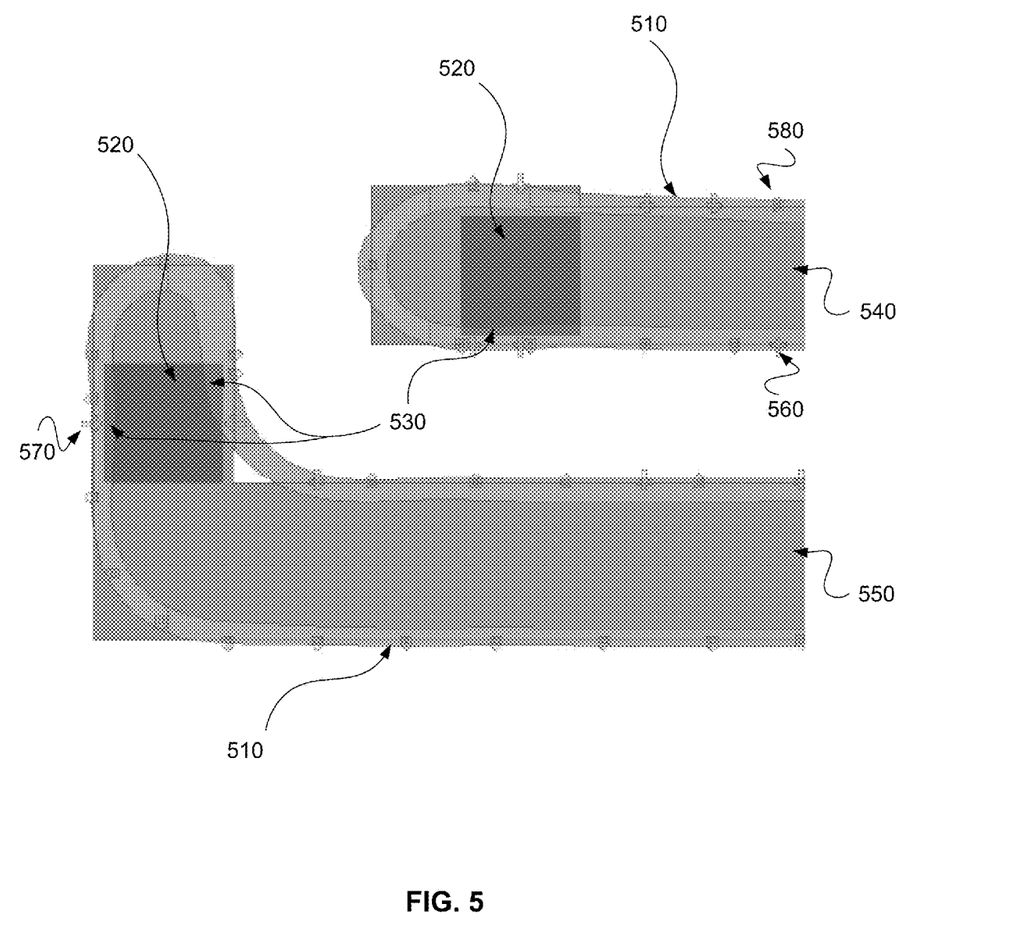
FIG. 5 illustrates a PV band for two polygons in a layout region.

The flow illustrated in FIG. 4 starts with operation 410, performing process window simulation. In the operation 410, the simulation module 320 simulates process variations such as focus and dose errors to generate process window information for a layout design. With various implementations of the invention, a PV band may be generated for the layout design. FIG. 5 illustrates such a PV band 510 for two polygons 540 and 550 in a layout region. The two squares 520 show contacts from an enclosure layer that should be covered by the polygons 540 and 550. However, the PV band 510 overlaps portions of the squares 520 as shown in FIG. 5. The overlapped regions 530 suggest the existence of enclosure hotspots. Pinching problems can be seen in FIG. 5 as well especially near the line ends as the linewidth for both polygons 540 and 550 measured from the inside boundary of the PV band is much narrower than the targeted. Thus, the simulation module 320 may use the generated PV band to readily identify litho hotspots. To generate PV bands, the simulation module 320 can adopt a commercial process window simulation tool, such as those in the Calibre family of software tools available from Mentor Graphics Corporation, Wilsonville, Oreg.

In operation 420, the selection module 340 selects the edge fragments that may need to be retargeted. As discussed earlier, the selection may be based on user-supplied information, the process window information generated in the operation 410, or both. In various embodiments of the invention, the selection module 340 may identify simulation sites first. The simulation sites used by the OPC process may serve as candidates. These simulation sites are associated with edge fragments formed in the OPC process. In some situations, additional simulation sites may be needed. In FIG. 5, original OPC simulation sites are indicated by a small polygon consisting of a square and a triangle such as simulation site 580, and the added simulation sites are indicated by a cross shape such as simulation sites 560 and 570. The simulation site 560 is added because the OPC simulation site 580 does not have a corresponding site straight across the feature 540 and a pinching problem may exist in this area. The simulation site 570 and the one straight across the feature 550 are added because there are no simulation sites opposite the middle 10% of the enclosed shape 520. These two examples illustrate where new simulation sites may be added in some embodiments of the invention. They are neither exhaustive nor exclusive.

Figure 6:
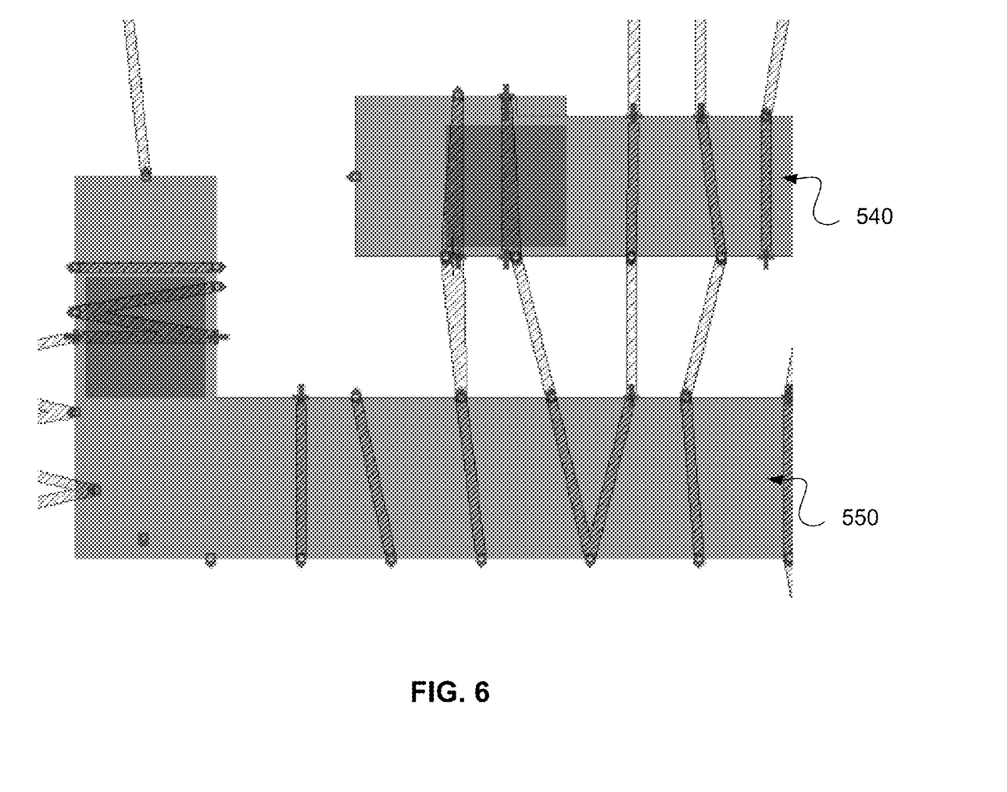
FIG. 6 illustrates CD gauges placed in a layout region.

In various embodiments of the invention, the selection module 340 identities pairs of simulation sites that are close to each other and nearly straight across a feature or space between them, and then connects each pair with a CD gauge. The CD gauges are illustrated with stripped bars in FIG. 6. These CD gauges are not physical features but serve as a computational tool for retargeting. They function like springs and exert "forces" on edge fragments to keep edge fragments from violating CD specifications.

An edge fragment across a feature (or space) from a selected edge fragment with an overlap projected onto the selected edge fragment larger than a predefined value may be considered as a possible CD gauge partner of the selected edge fragment. The simulation sites on both the fragments are examined for placing CD gauges. Users of the retargeting tool 300 may set rules for identifying simulation sites for placing CD gauges. One such rule may be that a pair of simulation sites will be selected for being connected with a CD gauge only if the distance between the two simulation sites is between a maximum value and a minimum value. The distance is measured perpendicular to the fragments associated with the simulation sites. One purpose for setting the maximum value is to exclude simulation sites in regions that are not hotspots or close to hotspots. The minimum value may be used to exclude simulation sites in regions where placing CD gauges will generate unwanted retargeting results. Another rule for identifying simulation site pairs and placing CD gauges may be that two simulation sites for placing a CD gauge should be nearly parallel. Each simulation site may be associated with an orientation defined by its simulation points. These simulation points, sometimes called "control points," are the points where the mage intensity is computed. The main control points are often arranged along a line which defines the site's orientation. A simulation site's orientation is usually perpendicular to the corresponding edge fragment. Thus, this rule tends to exclude simulation sites that are not on near parallel edge fragments.

Figure 7:
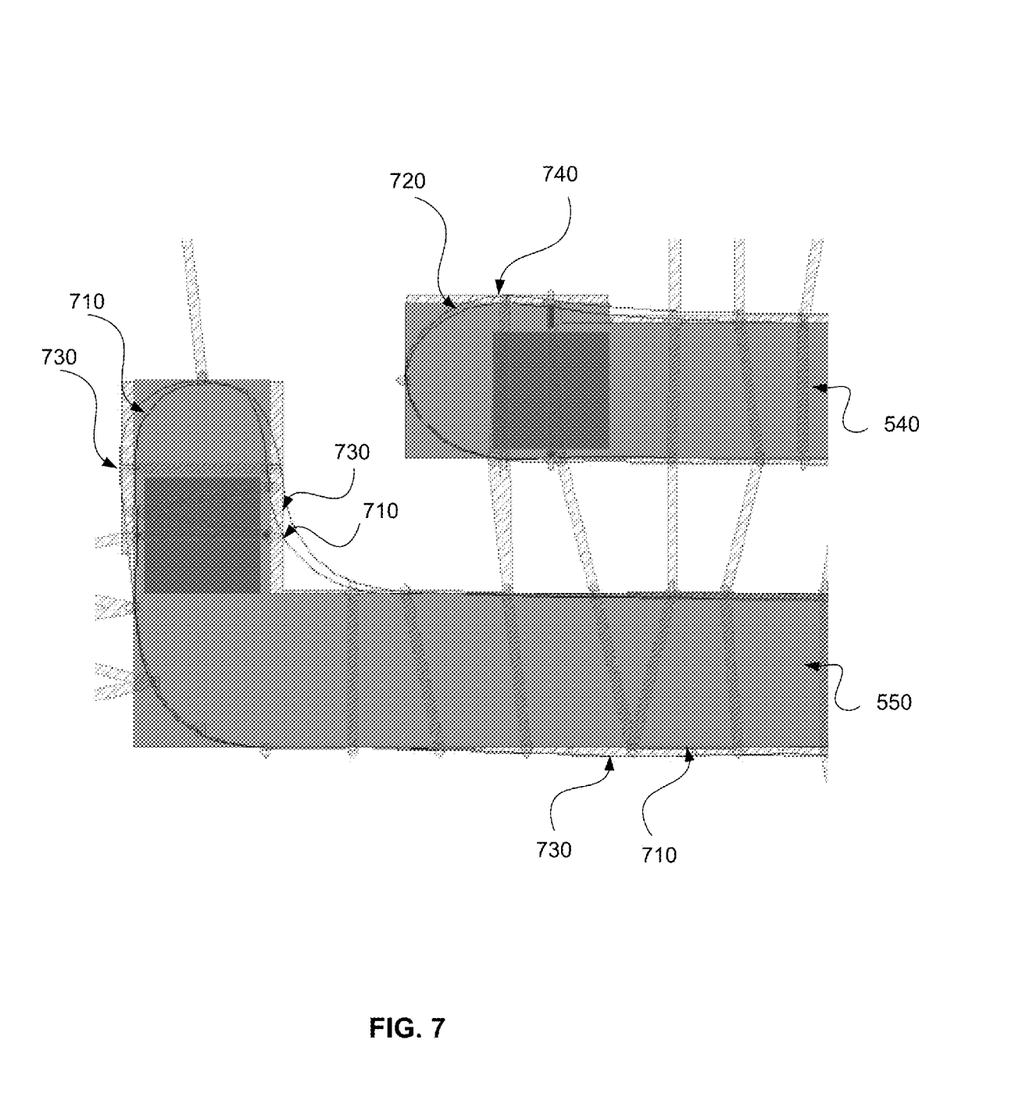
FIG. 7 illustrates the achievable target and the target generated by the retargeting process according to various embodiments of the invention.

In some OPC operations, the original drawn target for layout features is replaced with an "achievable target." For example, the opcIter in the Calibre family computes an achievable target to reduce OPC runtime along with other techniques. In FIG. 7, the contours 710 and 720 represent the achievable target for the polygons 540 and 550, respectively. As can be seen in the figure, the achievable target deviates from the original drawn target, which is shown by the contours of the shaded areas (730 and 740), significantly near line-ends and corners. CD gauges may not be wanted in regions that are too close to line ends or corners because they may force, for example, an undesired bulge in the line-end image. One way to prevent simulation sites in those regions being placed CD gauges is to use a rule that sets a maximum value for the angle between a simulation site and the local normal to the achievable target. This angle is a measure of the deviation of the achievable target from the drawn target and is large near line ends and corners.

Once the edge fragments are selected and the process window information is generated, the retargeting module 360 attempts, in operation 430, to fix hotspots by tuning targeted positions for the edge fragments to balance forces acting on them. For each edge fragment associated with at least one selected simulation site, there may be three categories of forces according to various implementations of the invention: 1) forces from enclosures and CD gauges, 2) restoring forces, and 3) limits on how much nominal image EPE (edge placement error) to sacrifice. The enclosure forces exist where there are enclosure violations, i.e., the size of the overlapping area between the PV band and an enclosed shape exceeding a limit. Its magnitude is proportional to the size of violation. Similarly, the CD gauge forces measure CD violations which are the driving forces for fixing local pinching or bridging hotspots. For a pinching hotspot, the starting gauge length is smaller than a specified CD and thus the CD gauge will try to push the edge fragments connected outward. The force magnitude is also proportional to the size of the violation. Both CD violations and enclosure violations may be derived based on process window simulation information generated by the operation 410.

A single edge fragment may have more than one CD gauges attaching to it or both the CD gauge forces and the enclosure forces acting on it on one of its two sides. According to various embodiments of the invention, the net force on that side is not the sum of the individual sources but the largest force. Otherwise, when there are two gauges on one side and only one on the other side, the violation on the former will be counted twice while the violation on the latter will be counted only once even if the violations for each gauge on both sides are equal in size.

The restoring forces attempts to pull edge fragments back to the nominal target. The nominal target may be the drawn target if no OPC process has been performed on the layout design. Or it may be the achievable target if the OPC process has produced one to replace the drawn target. The magnitude of the restoring forces R on an edge fragment is proportional to the distance measured from its current position x to the nominal target position $x_0$:

$$R = x_0 - x \qquad (1)$$

The third force category, the limits on how much nominal image EPE to sacrifice, may be combined with the restoring forces. Let $B_L$ represent the lower limit on the nominal EPE tolerance which is always less than or equal to −1, $B_H$ represent the upper limit on the nominal EPE tolerance which is always greater than or equal to 1, and epeForceScale represent the tolerance scale constant. Then Eq. (1) becomes:

$$R = epeForceScale \times (x_0 - x) \times \begin{cases} -1/B_L & x_0 - x \geq 0 \\ 1/B_H & x_0 - x < 0 \end{cases} \quad (2)$$

Eq. (2) means that a fragment with a smaller nominal EPE tolerance is given larger restoring force drawing the retargeting solution back to its nominal location. On the other hand, a fragment with a larger nominal EPE tolerance tends to get larger correction during retargeting due to its smaller R. $B_H$ and $B_L$ may be set per fragment by users. They may also be set to default values.

The three categories of forces set up a system of springs on the edge fragments. The force equation can be summarized as:

$$F = R + \max(\text{internal gauge violations and enclosures}) - \min(\text{external gauge violations}) \quad (3)$$

A solution may be found by running a time-domain simulation on all the fragments until all the forces balance, but subject to the hard constraints placed by the third category of forces. The third category of forces may act in two ways. One way is to act through the restoring forces (a type of spring forces) as illustrated in Eq. (2). Another way is to set "the hard constraints." These constraints may be set for individual fragments. They may also be set to default values.

Retargeting During OPC

Figure 8:
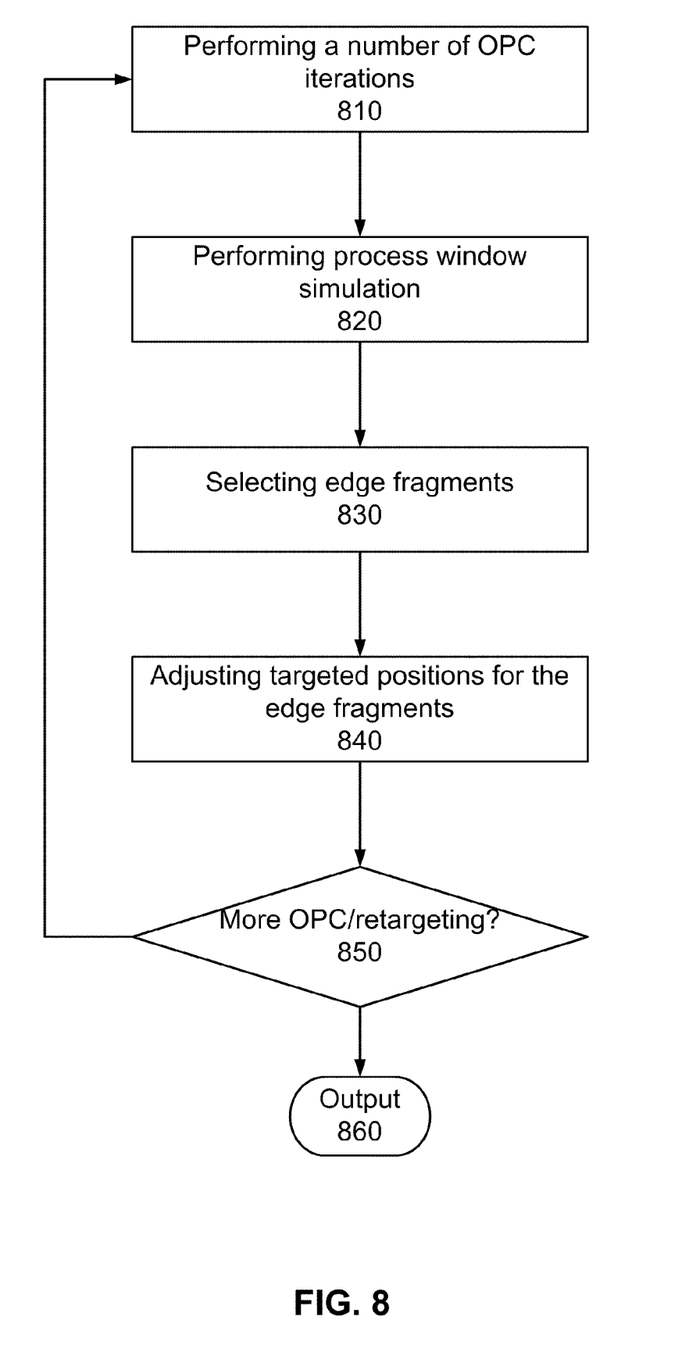
FIG. 8 illustrates a flowchart describing methods of combining retargeting and OPC according to various embodiments of the invention.
Figure 9:
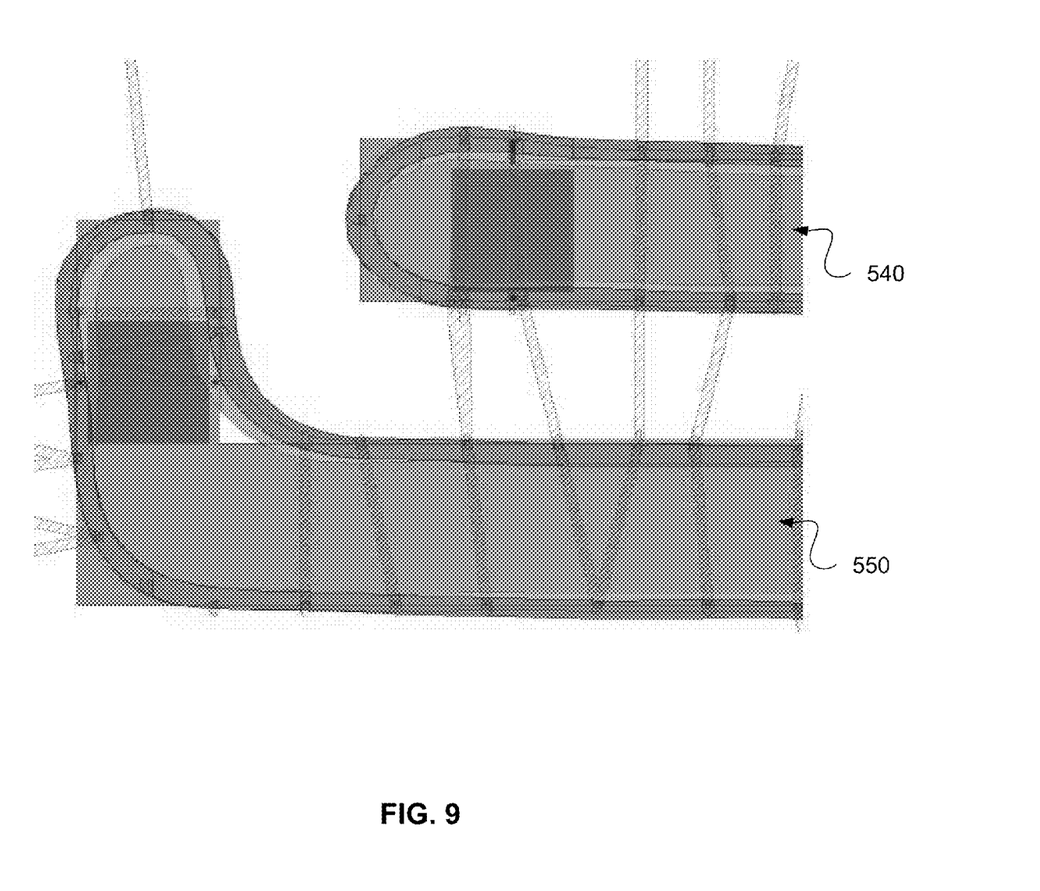
FIG. 9 compares the PV band after retargeting with the one before retargeting.

With various implementations of the invention, the retargeting process may be combined with the OPC process. FIG. 8 illustrates such a combination according to some embodiments of the invention. An OPC tool may first perform a preset number of OPC iterations 810. Then the retargeting tool 300 attempts to find process window hotspots and to repair them by retargeting 820-840. Using the new targets generated by the retargeting tool 300, the OPC tool may perform another round of OPC iterations. The whole process may repeat these steps until no hotspots are found or stop at any user-defined point. One such stop point may be a preset number of process window simulations have been performed. In FIG. 7, contours 730 and 740 represent the retargeted polygons 540 and 550. The PV band calculated based on the retargeted polygons are shown as a dark band in comparison to the original PV band in FIG. 9. As shown in FIG. 7 and FIG. 9, the targets for both polygons were adjusted. In particular, the target for the horizontal part of polygon 550 was shifted down to make room for fixing hotspots. In this case, the feature size is 70 nm and the minimum gap was set to 68 nm.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, instead of using CD gauges to visualize forces arising from CD violations, a process according to various implementations of the invention may just calculate forces based on the process window simulation information. Moreover, different classifications of the forces on edge fragments may be applied to achieve tuning edge fragment target positions in a balanced way. Furthermore, the operation 420, selecting simulation sites, may be performed prior to the operation 410, performing process window simulations.

What is claimed is:

1. A method of retargeting, comprising:
    performing, using a computer, a process window simulation on a layout design to generate process window information;
    selecting edge fragments for retargeting in the layout design, wherein the selecting edge fragments comprises identifying simulations sites; and connecting pairs of the simulation sites with CD (critical dimension) gauges according to one or more rules;
    adjusting targeted positions of the edge fragments to generate retargeted positions in a balanced way based on the process window information; and
    storing the retargeted positions.

2. The method recited in claim 1, wherein one of the one or more rules is selecting a pair of simulation sites to be connected with a CD gauge only if the distance between the pair of simulation sites is within a predefined range.

3. The method recited in claim 1, wherein one of the one or more rules is selecting simulation site for a CD gauge only if the angle between the simulation site and the normal to an achievable target for an edge fragment associated with the simulation site is less than a predefined value.

4. The method recited in claim 1, wherein one of the one or more rules is selecting a pair of simulation sites to be connected with a CD gauge only if the angle between the pair of simulation sites is less than a predefined value.

5. The method recited in claim 1, wherein the simulation sites comprises simulation sites used in an OPC process.

6. The method recited in claim 5, wherein the simulation sites further comprises simulation sites added according to one or more criteria.

7. The method recited in claim 6, wherein one of the one or more criteria is that a simulation site should be added to an edge fragment that is near the middle of an enclosed shape if no such a simulation site exists for the edge fragment.

8. A method of retargeting, comprising:
    performing, using a computer, a process window simulation on a layout design to generate process window information;
    selecting edge fragments for retargeting in the layout design;
    adjusting targeted positions of the edge fragments to generate retargeted positions in a balanced way based on the process window information, wherein the adjusting targeted positions comprises balancing forces acting on the edge fragments, the forces being derived based on totally or partially on the process window information, wherein the forces include CD gauge forces, restoring forces, and if an enclosed shape is involved, enclosure forces; and
    storing the retargeted positions.

9. The method recited in claim 8, wherein the forces further include forces related to edge placement error (EPE) tolerances.

10. A processor-readable device storing processor-executable instructions for causing one or more processors to perform retargeting by the following steps:
    performing a process window simulation on a layout design to generate process window information;

selecting edge fragments for retargeting in the layout design, wherein the selecting edge fragments comprises identifying simulations sites; and connecting pairs of the simulation sites with CD gauges according to one or more rules;

adjusting targeted positions of the edge fragments to generate retargeted positions in a balanced way based on the process window information; and storing the retargeted positions.

11. A processor-readable device storing processor-executable instructions for causing one or more processors to perform retargeting by the following steps:

performing a process window simulation on a layout design to generate process window information;

selecting edge fragments for retargeting in the layout design;

adjusting targeted positions of the edge fragments to generate retargeted positions in a balanced way based on the process window information, wherein the adjusting targeted positions comprises balancing forces acting on the edge fragments, the forces being derived based on totally or partially on the process window information, wherein the forces include CD gauge forces, restoring forces, and if an enclosed shape is involved, enclosure forces; and storing the retargeted positions.

12. The processor-readable device recited in claim 11, wherein the forces further include forces related to edge placement error (EPE) tolerances.

13. A system comprising one or more processors, the one or more processors programmed to perform retargeting by the following steps:

performing a process window simulation on a layout design to generate process window information;

selecting edge fragments for retargeting in the layout design, wherein the selecting edge fragments comprises identifying simulations sites; and connecting pairs of the simulation sites with CD gauges according to one or more rules;

adjusting targeted positions of the edge fragments to generate retargeted positions in a balanced way based on the process window information; and storing the retargeted positions.

14. A system comprising one or more processors, the one or more processors programmed to perform retargeting by the following steps:

performing a process window simulation on a layout design to generate process window information;

selecting edge fragments for retargeting in the layout design;

adjusting targeted positions of the edge fragments to generate retargeted positions in a balanced way based on the process window information, wherein the adjusting targeted positions comprises balancing forces acting on the edge fragments, the forces being derived based on totally or partially on the process window information, wherein the forces include CD gauge forces, restoring forces, and if an enclosed shape is involved, enclosure forces; and storing the retargeted positions.

15. The system recited in claim 14, wherein the forces further include forces related to edge placement error (EPE) tolerances.

* * * * *